Patented Aug. 21, 1928.

1,681,600

UNITED STATES PATENT OFFICE.

CHRISTIAAN van LOON, OF DORDRECHT, NETHERLANDS.

PROCESS OF PREPARING ALKALI-METAL ALCOHOLATES OF COMPOUNDS CONTAINING ALCOHOLIC HYDROXYL GROUPS.

No Drawing. Application filed July 20, 1927, Serial No. 207,312, and in the Netherlands July 21, 1925.

The alcoholates of the alkali metals are commonly prepared by dissolving the alkali metal in the anhydrous alcohol or by converting such a solution with another alcohol, in such a way that the metal atom is transferred from the molecule of the first alcohol to the second alcohol and subsequently distilling off the free alcohol.

In some cases it appeared to be possible to obtain a crystalline alcoholate containing water of crystallization from an alkali metal hydroxide and an alcohol in watery solution by slow evaporation at room temperature over phosphorus pentoxide which after isolation lost its water of crystallization on heating. However, the yield of hydrated crystalline alcoholate and therefore also of anhydrous alcoholate is very small, and moreover the consumption of phosphorus pentoxide is prohibitive to the technical application of this process. In this way Deforcrand (Comptes Rendus (1891), Tome 113, p. 1048) obtained, by leaving a mixture of 62 gr. of glycol and 2 or 3 equivalents of sodium hydroxide in saturated solution for 8 to 10 days, beside phosphorus pentoxide, 5 to 6 gr. of crystals having the formula $C_2H_4O_2Na_2 + 10H_2O$; after draining these crystals on a porous plate from the mother liquid, the water of crystallization was driven off at 150° C. in a current of dry hydrogen. Deforcrand however in view of the small yield preferred another process of preparation, viz, by the reaction of glycol on a solution of sodium in absolute ethyl alcohol. The first mentioned process does not come into consideration for technical application at all.

This application is a continuation in part of my application Serial No. 132,048, filed August 27th, 1926.

My invention is based on the discovery that the water which would be set free by the interaction of the alcoholic hydroxyl groups of compounds containing two or more of such groups with alkali metal hydroxides may be expelled by heat evaporation.

Therefore, according to my invention the alkali metal compounds of substances containing two or more alcoholic hydroxyl groups, with the exception of sugars are prepared by simply evaporating the solution of the hydroxyl containing compounds in aqueous alkali metal hydroxide (in the calculated proportion) by heating to a maximum temperature, between 50° C. and 350° C., but lower than the temperature at which deterioration begins and sufficiently high to obtain the expulsion of the last portions of water within a reasonable time limit, preferably under reduced pressure. If the suitable temperature is chosen, which differs in accordance with the substances treated and ought to be ascertained by experiment, at the end a final weight is obtained, which remains constant or which at least only slightly alters, and the desired alcoholate is obtained in a purity which practically corresponds to that of the starting materials whereas the yield approximates to the theoretical one.

Preferably the evaporation is performed in such a way that at first a temperature is maintained by which the bulk of the water evaporates but calmly. By mechanically stirring the mass it may be obtained in a finely divided condition on solidification which promotes the formation of a large surface and as a consequence the expelling of the last portions of the water. Subsequently the temperature is raised to the chosen final temperature.

In various cases it appeared to be preferable to promote the expelling of the last portion of the water by passing a current of a non-reactive gas, preferably at reduced pressure through the mass.

If desired one may also use as the starting material mixtures containing an excess either of the hydroxyl containing compound or of alkali metal hydroxide, so obtaining solutions, compounds or mixtures containing the excess of the hydroxyl compound or of the alkali. If the alcoholates are to be used as catalyst, catalyst carriers may be admixed to or dissolved in the solution of starting materials previous to dehydration. The alkali compounds of compounds containing alcoholic hydroxyl groups, which in the specification and claims are called alcoholates, are used for preparing derivatives of the said hydroxyl containing compounds, as catalyzers with various reactions, as dehydrating substances, etc. By way of example the preparation of mono sodium and di-sodium glycolate will now be described as an application of the process according to the invention.

1. A solution of one mol. (62.0 gr.) of glycol in 1 mol. of concentrated caustic soda solution, 61.24 gr. one gr. of which corresponds to 16.33 c. cm. $1/n$ NaOH, was boiled down under vacuum on a water bath, the finally solidified mass being thoroughly loosened by shaking. Consequently a current of hydrogen was passed through the mass at 110° C. during some hours under reduced pressure, whereafter the calculated weight of 84.1 gr. was reached.

The product contained as ascertained by titration of the watery solution of the free alkali according to Winkler (vide Reckurt's Meth. d. Massanalyse 1913) a sodium content of 26.2% whereas the theoretical content is 27.4%.

2. A solution of 1 mol. (62.0 gr.) of glycol in 2 mol. of a concentrated caustic soda solution (122.48 gr. one gr. of which corresponds to 16.33 c. cm. $1/n$ NaOH) was treated as described in Example 1 on a water bath, subsequently a current of hydrogen being passed through the mass at 115° C. under reduced pressure during 3 hours, whereafter its weight remained constant at 106.2 gr. corresponding to 1 mol. di-sodium glycolate.

Analyzed in the manner mentioned above the product contained 43.1% Na whereas for di-sodium glycolate the theory requires 43.5% Na.

The preparation of saccharates is not included in the scope of this invention.

I claim:

1. A process of preparing alkali metal alcoholates of non-sugar-containing compounds containing two or more alcoholic hydroxyl groups, comprising dehydrating a solution of the hydroxyl containing compound in an aqueous solution of an alkali metal hydroxide by heating to a maximum temperature between 50° C. and 350° C., but lower than the temperature at which deterioration begins and sufficiently high to obtain the expulsion of the last portions of water.

2. A process of preparing alkali metal alcoholates of non-sugar-containing compounds containing two or more alcoholic hydroxyl groups, comprising dehydrating a solution of the hydroxyl containing compound in an aqueous solution of an alkali metal hydroxide by heating under reduced pressure to a maximum temperature between 50° C. and 350° C., but lower than the temperature at which deterioration begins and sufficiently high to obtain the expulsion of the last portions of water.

3. A process of preparing alkali metal alcoholates of non-sugar-containing compounds containing two or more alcoholic hydroxyl groups, comprising dehydrating a solution of the hydroxyl containing compound in an aqueous solution of an alkali metal hydroxide by passing a current of a non-reactive gas through the mass of reaction at a maximum temperature between 50° C. and 350° C., but lower than the temperature at which deterioration begins and sufficiently high to obtain the expulsion of the last portions of water.

4. A process of preparing alkali metal alcoholates of non-sugar-containing compounds containing two or more alcoholic hydroxyl groups comprising dehydrating a solution of the hydroxyl containing compound in an aqueous solution of an alkali metal hydroxide by passing a current of a non-reactive gas through the mass of reaction at a maximum temperature between 50° C. and 350° C., but lower than the temperature at which deterioration begins and sufficiently high to obtain the expulsion of the last portions of water and under reduced pressure.

5. A process of preparing alkali metal alcoholates of non-sugar-containing compounds containing two or more alcoholic hydroxyl groups comprising dehydrating a mixture of a solution of the hydroxyl containing compound in an aqueous solution of an alkali metal hydroxide with catalyst carriers by heating to a maximum temperature between 50° C. and 350° C., but lower than the temperature at which deterioration begins and sufficiently high to obtain the expulsion of the last portions of water.

6. A process of preparing alkali metal alcoholates of non-sugar-containing compounds containing two or more alcoholic hydroxyl groups comprising dehydrating a mixture of a solution of the hydroxyl containing compound in an aqueous solution of an alkali metal hydroxide with catalyst carriers by heating under reduced pressure to a maximum temperature between 50° C. and 350° C., but lower than the temperature at which deterioration begins and sufficiently high to obtain the expulsion of the last portions of water.

7. A process of preparing alkali metal alcoholates of non-sugar-containing compounds containing two or more alcoholic hydroxyl groups, comprising dehydrating a mixture of a solution of the hydroxyl containing compound in an aqueous solution of an alkali metal hydroxide with catalyst carriers by passing a current of a non-reactive gas through the mass of reaction at a maximum temperature between 50° C. and 350° C., but lower than the temperature at which deterioration begins and sufficiently high to obtain the expulsion of the last portions of water.

8. A process of preparing alkali metal alcoholates of non-sugar-containing compounds containing two or more alcoholic hydroxyl groups, comprising dehydrating a mixture of a solution of the hydroxyl containing compound in an aqueous solution of an alkali metal hydroxide with catalyst carriers by passing a current of a non-reactive gas through the mass of reaction at a maximum temperature between 50° C. and 350° C., but lower than the temperature at which deterioration begins and sufficiently high to obtain the expulsion of the last portions of water and under reduced pressure.

In testimony whereof I affix my signature.

CHRISTIAAN van LOON.